US012429018B2

(12) United States Patent
Matsutake et al.

(10) Patent No.: US 12,429,018 B2
(45) Date of Patent: Sep. 30, 2025

(54) PRESTROKE ADJUSTMENT METHOD FOR FUEL INJECTION VALVE

(71) Applicant: Hitachi Astemo, Ltd., Hitachinaka (JP)

(72) Inventors: Ryohei Matsutake, Hitachinaka (JP); Kenichi Gunji, Hitachinaka (JP); Masashi Sugaya, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 437 days.

(21) Appl. No.: 18/009,633

(22) PCT Filed: Feb. 5, 2021

(86) PCT No.: PCT/JP2021/004269
§ 371 (c)(1),
(2) Date: Dec. 9, 2022

(87) PCT Pub. No.: WO2021/255986
PCT Pub. Date: Dec. 23, 2021

(65) Prior Publication Data

US 2023/0228238 A1 Jul. 20, 2023

(30) Foreign Application Priority Data

Jun. 18, 2020 (JP) ................................ 2020-105611

(51) Int. Cl.

| | |
|---|---|
| ***F02M 61/10*** | (2006.01) |
| ***F02M 51/06*** | (2006.01) |
| ***F02M 61/16*** | (2006.01) |

(52) U.S. Cl.
CPC ............ *F02M 61/10* (2013.01); *F02M 51/06* (2013.01); *F02M 61/161* (2013.01)

(58) Field of Classification Search
CPC ........... F02M 51/0685; F02M 51/0671; F02M 2200/8092; F02M 61/161
See application file for complete search history.

(56) References Cited

U.S. PATENT DOCUMENTS 4,730,785 A * 3/1988 Seifert .................. F02M 61/08 239/453
2003/0141476 A1 7/2003 Sebastian
(Continued)

FOREIGN PATENT DOCUMENTS

DE 100 65 528 A1 7/2002
DE 10 2005 032 461 A1 1/2007
(Continued)

OTHER PUBLICATIONS

German-language Office Action issued in German Application No. 11 2021 002 276.8 dated Feb. 6, 2025 with English translation (10 pages).
(Continued)

*Primary Examiner* — Joseph A Greenlund
(74) *Attorney, Agent, or Firm* — Crowell & Moring LLP

(57) ABSTRACT

Provided is a prestroke adjustment method for a fuel injection valve capable of reducing variations in a prestroke amount regardless of the level of machining accuracy of a component. The prestroke adjustment method adjusts a prestroke amount D2 of a fuel injection valve 1 including a gap forming member 50 that forms a gap G2 defining a prestroke between a valve member 30 and engagement portions 33*a* and 423*a* of a movable core 42 by a second portion 52*a* abutting on the movable core 42 in a state where a first portion 51*a* is positioned at a reference position 33*b* of the valve member 30. In the prestroke adjustment method, a load L in the direction from the first portion 51*a* toward the reference position 33*b* of the valve member 30 is applied to the gap forming member 50 assembled to the valve member 30 to plastically deform the gap forming member 50, thereby shortening the relative length between the first portion 51*a* and the second portion 52*a* and setting the prestroke amount D2 to the target value T2.

5 Claims, 7 Drawing Sheets

(56) References Cited

U.S. PATENT DOCUMENTS

| | | | | |
|---|---|---|---|---|
| 2005/0089426 | A1* | 4/2005 | Kurz | F02M 63/0225 417/490 |
| 2008/0277505 | A1* | 11/2008 | Hoang | F02M 51/0685 239/585.5 |
| 2014/0076284 | A1* | 3/2014 | Gunji | F02M 51/0671 123/470 |
| 2015/0090913 | A1* | 4/2015 | Buehner | F02M 51/0685 251/129.19 |
| 2017/0260952 | A1* | 9/2017 | Nakai | F02M 51/0685 |
| 2019/0360442 | A1* | 11/2019 | Saizen | F02M 51/0685 |
| 2020/0232433 | A1* | 7/2020 | Sugaya | F02M 63/0075 |
| 2021/0102520 | A1* | 4/2021 | Miyamoto | F02M 61/168 |
| 2021/0115887 | A1* | 4/2021 | Mizobuchi | F02M 51/0671 |
| 2023/0228238 | A1* | 7/2023 | Matsutake | F02M 61/10 239/584 |

FOREIGN PATENT DOCUMENTS

| | | | |
|---|---|---|---|
| DE | 10 2006 055 555 | A1 | 5/2008 |
| JP | 2008-75478 | A | 4/2008 |
| JP | 2012-237267 | A | 12/2012 |
| WO | WO 2016/042896 | A1 | 3/2016 |

OTHER PUBLICATIONS

International Search Report (PCT/ISA/210) issued in PCT Application No. PCT/JP2021/004269 dated Apr. 20, 2021 with English translation (five (5) pages).

Japanese-language Written Opinion (PCT/ISA/237) issued in PCT Application No. PCT/JP2021/004269 dated Apr. 20, 2021 (three (3) pages).

* cited by examiner

PRESTROKE ADJUSTMENT METHOD FOR FUEL INJECTION VALVE

TECHNICAL FIELD

The present invention relates to a prestroke adjustment method for a fuel injection valve that performs a valve opening/closing operation of a valve member by driving a movable element, and relates to a prestroke adjustment method for adjusting a magnitude of a prestroke defined by a gap formed between the valve member and the movable element.

BACKGROUND ART

A fuel injection valve used in an internal combustion engine includes a valve member having a valve body in contact with a valve seat, and a movable element relatively displaceable in a valve opening/closing direction with respect to the valve member, and performs a valve opening/closing operation of the valve member by driving the movable element. Among such fuel injection valves, there is known a technique in which a gap forming member (intermediate material) is disposed so as to be able to abut on a valve member (plunger rod) and a movable element (anchor) to form a gap defining a prestroke between the valve member and the movable element in a valve closed state, and the movable element enters (displaces) by a size of the gap without accompanying the valve member, and then engages with an engagement portion of the valve member (after the prestroke) to move the valve member in a valve opening direction (see, for example, PTL 1). The technique aims to improve the responsiveness of the valve opening operation by utilizing the kinetic energy of the movable element stored by approach for the valve opening operation of the valve member.

The fuel injection valve described in PTL 1 includes, in addition to the valve member and the anchor, a fixed core that applies a magnetic attraction force to the anchor to attract the anchor in the valve opening direction, a first spring that biases the valve member in the valve closing direction, and a second spring that biases the anchor in the valve opening direction from the opposite side of the fixed core. Both the anchor and the valve member are provided with an engagement portion that engages with each other when the anchor is displaced in the valve opening direction with respect to the valve member to regulate the displacement of the anchor in the valve opening direction. The anchor is biased in the valve closing direction from the fixed core side by a third spring whose biasing force is smaller than that of the first spring and larger than that of the second spring. When the gap forming member abuts on the anchor in a state of being positioned at the reference position of the valve member, a gap defining a prestroke is formed between the engagement portion on the valve member side and the engagement portion on the anchor side, and the third spring biases the gap forming member in the valve closing direction so as to be positioned at the reference position.

CITATION LIST

Patent Literature

PTL 1: WO 2016/042896

SUMMARY OF INVENTION

Technical Problem

Meanwhile, in a case where the gap defining the prestroke described above is formed excessively small, the kinetic energy of the movable element (anchor) is too low to be used for the valve opening operation, and the valve cannot be opened under a high pressure condition (for example, 25 MPa or more). Conversely, in a case where the gap defining the prestroke is excessively formed, the action of the magnetic attraction force on the movable element becomes weak, and the movable element is not attracted in the valve opening direction and cannot be opened. For this reason, the magnitude (prestroke amount) of the prestroke for improving the responsiveness of the valve opening operation has a narrow allowable range of variation of ±several tens of μm.

In the fuel injection valve described in PTL 1, the gap forming member includes a recess capable of accommodating the engagement portion (flange-shaped stepped portion) of the plunger rod on the end surface side facing the anchor, and the recess opening side of the gap forming member abuts on the anchor in a state where the bottom surface of the recess of the gap forming member is positioned at the engagement portion (reference position) of the plunger rod, whereby a gap defining a prestroke is formed between the engagement portion of the plunger rod and the engagement portion of the anchor. That is, a dimension obtained by subtracting a distance dimension (height dimension) between both stepped portions of the stepped portion of the plunger rod from a depth dimension of the recess of the gap forming member corresponds to the prestroke amount. That is, the prestroke amount is defined by a dimensional difference between two components.

For this reason, it is conceivable to set the dimensional tolerance of each of the single component to ±several μm in order to keep the variation in the prestroke amount within the above-described allowable range. However, it is difficult to manufacture the component with such dimensional tolerances from the viewpoint of machining accuracy and cost of the machine tool. On the other hand, when two components machined with a machining accuracy with a dimensional tolerance larger than ±several μm are arbitrarily assembled, the variation in the prestroke amount may exceed the above-described allowable range.

Therefore, all the dimensions (the depth dimension of the recess of the gap forming member and the interval dimension of the stepped portion of the plunger rod) of a large number of two components processed with a predetermined machining accuracy are actually measured, and the two components are selected and combined so that the variation in the prestroke amount falls within a predetermined allowable range. For this reason, many man-hours are required in order to keep the variation in the prestroke amount within a predetermined allowable range.

The present invention has been made to solve the above problems, and an object of the present invention is to provide a prestroke adjustment method for a fuel injection valve capable of reducing variations in a prestroke amount regardless of the level of machining accuracy of a component.

Solution to Problem

The present application includes a plurality of means for solving the above problems, and an example thereof is a prestroke adjustment method for adjusting a prestroke amount of a fuel injection valve that includes: a valve member having a valve body at a tip portion, the valve body being capable of seating on and separating from a valve seat; a movable element relatively displaceable in a valve opening/closing direction with respect to the valve member and engageable with the valve member; and a gap forming member configured to be relatively displaceable in a valve opening/closing direction with respect to the valve member and the movable element, the gap forming member forming a gap defining a prestroke between the valve member and an engagement portion of the movable element by a second portion abutting on the movable element in a state where a first portion is positioned at a reference position of the valve member. The gap forming member has an adjustment margin before adjustment of the prestroke amount. A load in a direction from the first portion toward the reference position of the valve member is applied to the gap forming member in a state of being assembled to the valve member. The gap forming member is plastically deformed to reduce a relative length between the first portion and the second portion to set a prestroke amount to a target value.

Advantageous Effects of Invention

According to the present invention, by plastically deforming the gap forming member in a state of being assembled to the valve member, the dimensional difference (corresponding to the prestroke amount) at the predetermined position between the two components of the valve member and the gap forming member can be shortened to the target value. Therefore, even if the two components have a large dimensional tolerance due to the machining accuracy, the influence of the dimensional tolerance on the dimensional difference at the predetermined position between the two components after adjustment can be reduced. That is, the variation in the prestroke amount can be reduced regardless of the machining accuracy of the components.

Objects, configurations, and effects besides the above description will be apparent through the explanation on the following embodiments.

DESCRIPTION OF EMBODIMENTS

Hereinafter, a prestroke adjustment method for a fuel injection valve according to an embodiment of the present invention will be described with reference to the drawings. An example in which the stroke adjustment method of the present embodiment is applied to an electromagnetic fuel injection valve that electromagnetically drives a valve member has been described.

Embodiment

Figure 1:
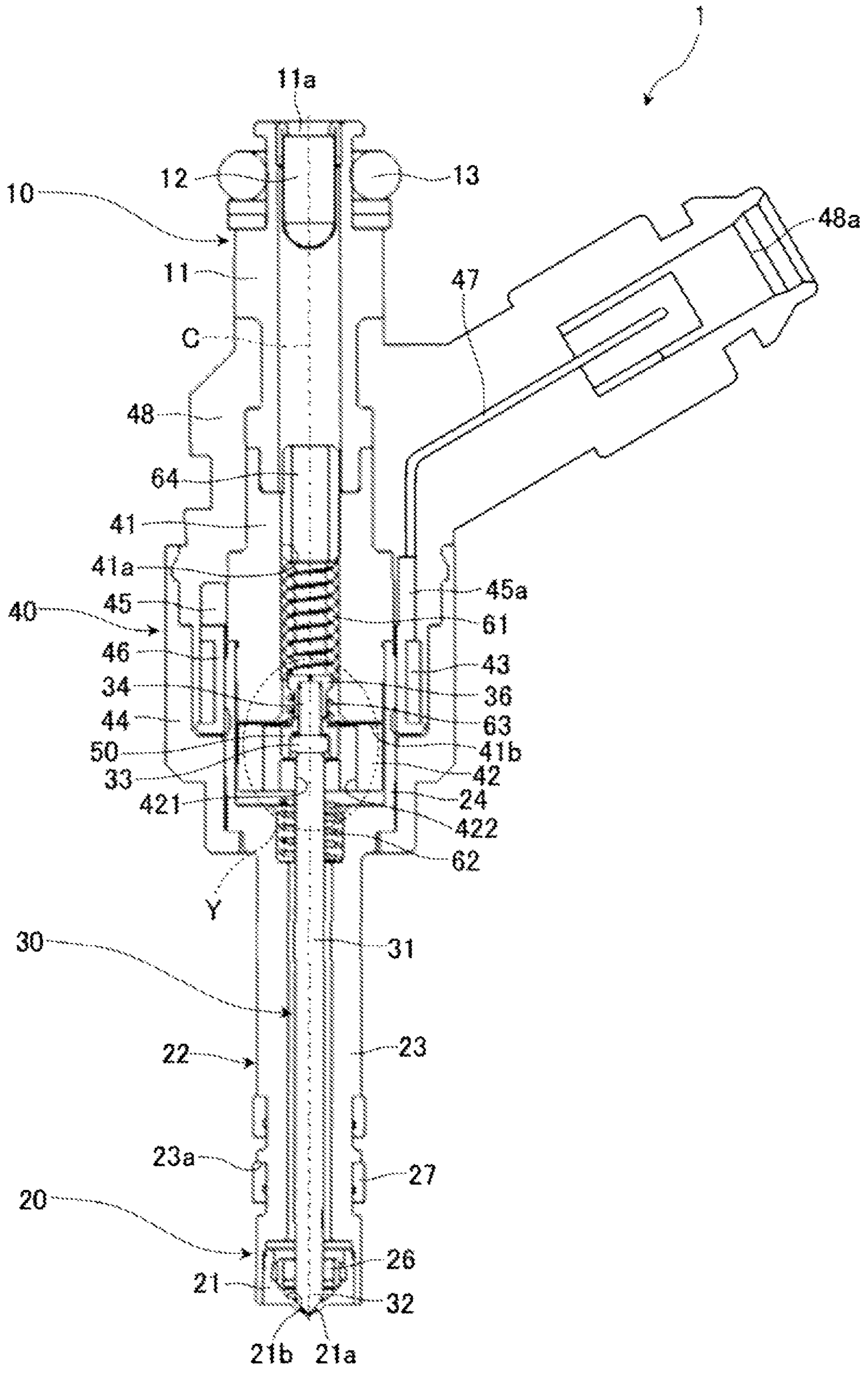
FIG. 1 is a longitudinal sectional view illustrating a structure of a fuel injection valve to which a prestroke adjustment method according to a first embodiment of the present invention is applied.

First, a configuration of a fuel injection valve to which a prestroke adjustment method according to a first embodiment of the present invention is applied will be described with reference to FIG. 1. FIG. 1 is a longitudinal sectional view illustrating a structure of the fuel injection valve to which the prestroke adjustment method according to the first embodiment of the present invention is applied. FIG. 1 illustrates a state in which the valve member is closed and a state in which the movable core is stationary. In the following description, the vertical direction is defined on the basis of FIG. 1. This vertical direction does not necessarily coincide with the vertical direction in the mounted state of the fuel injection valve.

In FIG. 1, a fuel injection valve 1 is of an electromagnetic type that performs fuel injection by electromagnetically driving a valve member 30. Specifically, the fuel injection valve 1 includes a fuel introduction mechanism 10 that introduces fuel inside, a nozzle mechanism 20 that injects the introduced fuel, a valve member 30 capable of allowing and blocking fuel injection of the nozzle mechanism 20, and an electromagnetic drive mechanism 40 that electromagnetically drives the valve member 30. In the fuel injection valve 1, a fuel pipe (not illustrated) is connected to the fuel introduction mechanism 10, and the nozzle mechanism 20 is inserted into an attachment hole of an intake pipe (not illustrated) or a combustion chamber forming member (a cylinder block, a cylinder head, or the like) of an internal combustion engine and attached. The fuel injection valve 1 injects the fuel introduced from the fuel pipe into the fuel introduction mechanism 10 from the nozzle mechanism 20 into the intake pipe or the combustion chamber. The fuel injection valve 1 has a central axis C, and is configured such that fuel flows substantially along a direction in which the central axis C extends (in FIG. 1, the vertical direction).

The fuel introduction mechanism 10 includes a fuel pipe 11 extending along the central axis C and having an inside constituting a part of a fuel passage, and a filter 12 disposed inside the fuel pipe 11. The fuel pipe 11 has a fuel introduction port 11*a* into which fuel is introduced at one end portion (in FIG. 1, the upper end portion). The filter 12 filters foreign matter mixed in the fuel in the fuel introduction port 11*a*. A seal member 13 is provided on an outer peripheral portion of the fuel pipe 11 on the fuel introduction port 11*a* side. The seal member 13 prevents fuel leakage from a connection portion with the fuel pipe when the fuel pipe 11 is attached to the fuel pipe, and is formed of, for example, an O-ring. The other end portion (in FIG. 1, the lower end portion) of the fuel pipe 11 is attached to a fixed core 41, which will be described later, of the electromagnetic drive mechanism 40.

The nozzle mechanism 20 includes a nozzle member 21 having a fuel injection hole 21*a* (see also FIG. 2) for injecting fuel, and a nozzle holder 22 for holding the nozzle member 21. The nozzle holder 22 is connected to the fuel pipe 11 via a fixed core 41 to be described later of the electromagnetic drive mechanism 40, and is a cylindrical body extending in the same direction (along the central axis C) as the extending direction of the fuel pipe 11. The nozzle holder 22 is configured such that the inside functions as a part of the fuel passage and accommodates the valve member 30 and some members of the electromagnetic drive mechanism 40 therein. The nozzle holder 22 includes a small-diameter cylindrical portion 23 having a relatively small outer diameter and a large-diameter cylindrical portion 24 having an outer diameter larger than that of the small-diameter cylindrical portion 23. Most of the valve member 30 is disposed inside the small-diameter cylindrical portion 23, and a part of the valve member 30 and members such as a movable core 42 and a gap forming member 50, which will be described later, of the electromagnetic drive mechanism 40 are disposed inside the large-diameter cylindrical portion 24.

The nozzle member 21 is inserted and fixed inside the tip portion of the small-diameter cylindrical portion 23. The nozzle member 21 is formed of, for example, a member called an orifice cup formed in a cup shape, and has a conical valve seat 21*b* (see also FIG. 2) on the inner surface side. The outer peripheral end of the tip surface of the orifice cup 21 and the opening end of the tip portion of the small-diameter cylindrical portion 23 are welded to seal the joint portion between the orifice cup 21 and the small-diameter cylindrical portion 23. A guide member 26 is fixed inside the orifice cup 21 by press fitting or plastic coupling. The guide member 26 guides the movement of the valve member 30 in the valve opening/closing direction (direction along the central axis C), and is configured to be able to come into sliding contact with the outer peripheral surface of the valve member 30. An annular groove 23*a* is provided in an outer peripheral portion of the small-diameter cylindrical portion 23 on the nozzle member 21 side. A seal member 27 is fitted into the groove 23*a*. The seal member 27 maintains airtightness when the fuel injection valve 1 is mounted on the internal combustion engine. As the seal member 27, for example, a resin-made chip seal is used.

The valve member 30 is disposed inside the nozzle holder 22 so as to be movable in a contacting/separating direction (in FIG. 1, the vertical direction) with respect to the valve seat 21*b*. The valve member 30 includes a valve rod portion 31 extending in the contacting/separating direction with respect to the valve seat 21*b* (extending direction of the central axis C), a valve body 32 provided at one end portion (in FIG. 1, the lower end portion) of the valve rod portion 31 on the valve seat 21*b* side, a flange portion 33 provided at the other end portion (in FIG. 1, the upper end portion) of the valve rod portion 31 on the side opposite to the valve body 32 and protruding outward in the radial direction from the valve rod portion 31, and a protrusion 34 extending from the flange portion 33 to the side opposite to the valve rod portion 31. The valve body 32 can be seated on and separated from the valve seat 21*b* of the orifice cup 21. When the valve body 32 comes into contact with (sits on) the valve seat 21*b*, the flow of fuel to the fuel injection hole 21*a* is blocked. On the other hand, when the valve body 32 is spaced (separated) from the valve seat 21*b*, the fuel flow to the fuel injection hole 21*a* is allowed. The flange portion 33 is a portion that functions as an engagement portion to be engaged with a movable core 42 to be described later of the electromagnetic drive mechanism 40. The valve member 30 is guided to reciprocate in the valve opening/closing direction (the extending direction of the central axis C) by the guide member 26 disposed on the valve body 32 side (the orifice cup 21 side) and the movable core 42 disposed on the flange portion 33 side. A cap 36 is attached to the tip portion of the protrusion 34 by press fitting or the like. The cap 36 is a member constituting a spring seat of a first biasing spring 61 and a spring seat of a third biasing spring 63, which will be described later, of the electromagnetic drive mechanism 40. Details of the structures of the valve member 30 and the cap 36 will be described later.

The electromagnetic drive mechanism 40 includes a fixed core 41 attached to the opening of the large-diameter cylindrical portion 24 of the nozzle holder 22, a movable core 42 movably disposed inside the large-diameter cylindrical portion 24, an annular or tubular electromagnetic coil 43 disposed on the outer peripheral sides of the fixed core 41 and the large-diameter cylindrical portion 24, and a housing 44 surrounding the outer peripheral portions of the large-diameter cylindrical portion 24 and the electromagnetic coil 43 and functioning as a yoke. An annular magnetic passage surrounding the electromagnetic coil 43 is formed by the large-diameter cylindrical portion 24 of the nozzle holder 22, the fixed core 41, the movable core 42, and the housing 44.

An outer peripheral portion of one end portion (in FIG. 1, the lower end portion) of the fixed core 41 is press-fitted into an inner peripheral portion of the large-diameter cylindrical portion 24 of the nozzle holder 22 and welded at the contact position. The gap between the outer peripheral surface of the fixed core 41 and the inner peripheral surface of the large-diameter cylindrical portion 24 of the nozzle holder 22 is sealed by the welding. The fixed core 41 has a through hole 41*a* extending along the central axis C in the central portion. The through hole 41*a* of the fixed core 41 communicates with the fuel introduction port 11*a* of the fuel pipe 11 and the internal space of the nozzle holder 22, and constitutes a part of the fuel passage. The through hole 41*a* is formed so that the valve member 30 to which the cap 36 is attached can be inserted. That is, the inner diameter of the through hole 41*a* is set to be larger than the outer diameter of the cap 36. A C-shaped core member 45 in which an annular portion is missing is fitted to an outer peripheral portion of the fixed core 41 on the fuel introduction port 11*a* side of the electromagnetic coil 43. The fixed core 41 is a member for applying a magnetic attraction force to the movable core 42, and has an end surface 41*b* (in FIG. 1, the lower end surface) facing the movable core 42.

The movable core 42 is located closer to the nozzle member 21 than the fixed core 41, and is a member (movable element) attracted toward the fixed core 41 by the action of a magnetic attraction force. The outer peripheral surface of the movable core 42 slides on the inner peripheral surface of the large-diameter cylindrical portion 24 of the nozzle holder 22, so that the movement is guided in the valve opening/closing direction (the extending direction of the large-diameter cylindrical portion 24). That is, the large-diameter cylindrical portion 24 functions as a guide that guides the movement of the movable core 42. The movable core 42 has an insertion hole 421 into which the valve rod portion 31 of the valve member 30 can be inserted at the central portion, and is configured to be movable relative to the valve member 30. That is, the movable core 42 is configured such that the inner peripheral surface forming the insertion hole 421 is slidable with respect to the outer peripheral surface of the valve rod portion 31, and has a guide function of guiding the movement of the valve member 30. The movable core 42 has a through hole 422 constituting a fuel passage around the insertion hole 421. The movable core 42 is configured to be engaged with the flange portion 33 of the valve member 30 from the valve body 32 side (in FIG. 1, the lower side). The movable core 42 constitutes a movable portion movable in the nozzle holder 22 together with the valve member 30. Details of the structure of the movable core 42 will be described later.

The electromagnetic coil 43 is wound around an annular bobbin 46 having a U-shaped cross section and opening radially outward. A conductor portion 47 having high rigidity is attached to both end portions of the electromagnetic coil 43. The conductor portion 47 is drawn out from a hole 45*a* provided in the space of the missing portion of the core member 45 fitted to the outer periphery of the fixed core 41.

The housing 44 is formed in a tubular shape, and is fitted in a state where the large-diameter cylindrical portion 24 of the nozzle holder 22 is located inside. Inside the housing 44, most of the fixed core 41 and the electromagnetic coil 43 are disposed with a gap from the inner peripheral surface of the housing 44. The housing 44 constitutes a part of the outer shell of the fuel injection valve 1 together with the small-diameter cylindrical portion 23 of the nozzle holder 22.

The outer peripheral sides of the portions of the electromagnetic coil 43, the fixed core 41, and the fuel pipe 11 on the fixed core 41 side are covered with a resin cover 48. The resin cover 48 is molded by injecting an insulating resin from an opening of the housing 44 on the fuel introduction port 11*a* side. The resin cover 48 includes a connector 48*a* connectable to a plug for supplying power from a high-voltage power supply or a battery power supply. The conductor portion 47 is mostly embedded in the resin cover 48, but is partially exposed at the connector 48*a*.

In the large-diameter cylindrical portion 24 of the nozzle holder 22, the gap forming member 50 is disposed so as to be able to abut on the flange portion 33 (engagement portion) of the valve member 30 and the movable core 42 and to be relatively movable in the valve opening/closing direction (extending direction of the central axis C) with respect to the valve member 30 and the movable core 42. The gap forming member 50 is a member that forms a gap between the flange portion 33 (engagement portion) of the valve member 30 and the movable core 42 in the valve closed state in the valve opening/closing direction (extending direction of the central axis C) that defines the prestroke. The prestroke indicates that the movable core 42 moves in the valve opening direction while the valve body 32 of the valve member 30 remains in the valve closed state at the time of the valve opening operation. Details of the structure of the gap forming member 50 will be described later.

Inside the through hole 41*a* of the fixed core 41, the first biasing spring 61 is disposed at a position closer to the fuel introduction port 11*a* than the valve member 30 (in FIG. 1, the upper side), and an adjuster 64 is fixed by press fitting at a position closer to the fuel introduction port 11*a* than the first biasing spring. The first biasing spring 61 biases the valve member 30 in the valve closing direction (in FIG. 1, downward). One end portion (in FIG. 1, the lower end portion) of the first biasing spring 61 is in contact with the cap 36 attached to the protrusion 34 of the valve member 30, and the other end portion (in FIG. 1, the upper end portion) is supported by the adjuster 64. The adjuster 64 is configured to adjust the position of the fixed core 41 in the through hole 41*a,* and adjusts the biasing force of the first biasing spring 61 with respect to the valve member 30 in the valve closed state. The one end portion (in FIG. 1, the lower end portion) of the adjuster 64 constitutes a spring seat on the other end side of the first biasing spring 61.

Inside the large-diameter cylindrical portion 24 of the nozzle holder 22, a second biasing spring 62 is disposed at a position closer to the nozzle member 21 than the movable core 42. The second biasing spring 62 biases the valve member 30 in the valve opening direction (in FIG. 1, the upward direction) via the movable core 42. One end portion (in FIG. 1, the lower end portion) of the second biasing spring 62 is supported by the inner portion of the large-diameter cylindrical portion 24, and the other end portion (in FIG. 1, the upper end portion) is in contact with the movable core 42.

The third biasing spring 63 is disposed between the cap 36 and the gap forming member 50. The third biasing spring 63 biases the gap forming member 50 toward the movable core 42. The third biasing spring 63 has one end portion (in FIG. 1, the lower end portion) in contact with the gap forming member 50 and the other end portion (in FIG. 1, the upper end portion) in contact with the cap 36.

The above-described three biasing springs 61, 62, and 63 are a first biasing spring 61, a third biasing spring 63, and a second biasing spring 62 in descending order of biasing force.

Figure 2:
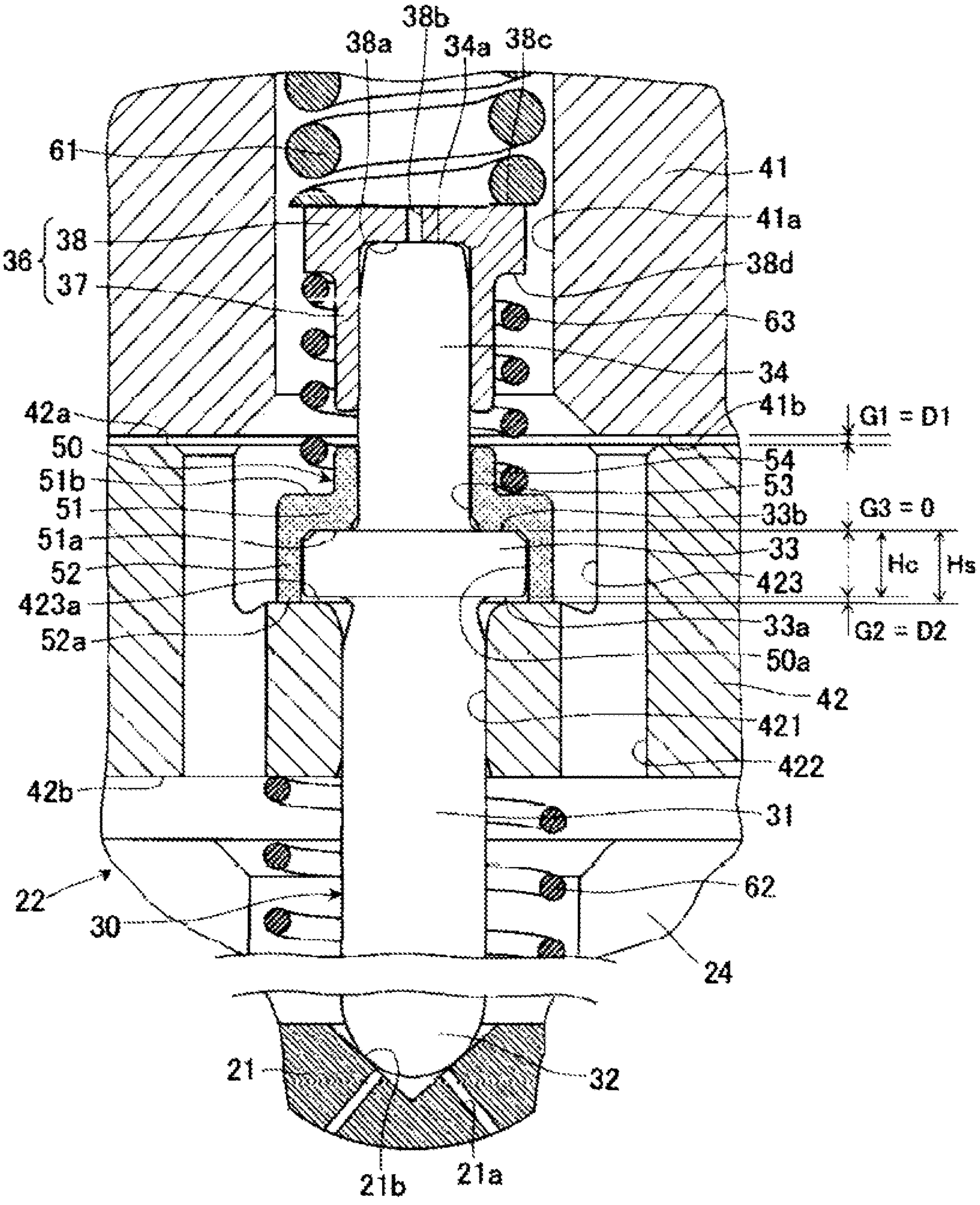
FIG. 2 is a sectional view illustrating a part of the fuel injection valve indicated by reference sign Y in FIG. 1 in an enlarged state.

Next, the structure of each member (valve member to which a cap is attached, movable core, and gap forming member) constituting the movable portion of the fuel injection valve will be described in detail with reference to FIG. 2. FIG. 2 is a sectional view illustrating a part of a fuel injection valve indicated by reference sign Y in FIG. 1 in an enlarged state. FIG. 2 illustrates a state in which the valve member is closed and a state in which the movable core is stationary.

In FIG. 2, the valve member 30 is formed by integrally forming the valve body 32, the valve rod portion 31, the flange portion 33, and the protrusion 34 as described above, and is, for example, a high-strength member formed of a martensitic steel material and quenched. The valve body 32 blocks the flow of the fuel to the fuel injection hole 21*a* by the tip surface abutting on the valve seat 21*b* of the nozzle member 21. The valve rod portion 31 is inserted into the insertion hole 421 of the movable core 42, and the outer peripheral surface thereof is configured to be slidable on an inner peripheral surface forming the insertion hole 421. That is, the movement of the valve rod portion 31 is guided by the movable core 42. The flange portion 33 is formed to have an outer diameter larger than the hole diameter of the insertion hole 421 of the movable core 42, and functions as an engagement portion to be engaged with the movable core 42. The flange portion 33 has an annular engagement surface 33*a* (in FIG. 2, the lower end surface) facing the valve body 32 side (in FIG. 1, the lower side) and engageable with the movable core 42, and an annular contact surface 33*b* (in FIG. 2, the upper end surface) facing the side opposite to the engagement surface 33*a* (in FIG. 1, the upper side) and abuttable on the gap forming member. The flange portion 33 has a height dimension Hc (or thickness) which is a dimensional difference between the engagement surface 33*a* and the contact surface 33*b*. The protrusion 34 is a rod-shaped portion having substantially the same outer diameter as the valve rod portion 31 and having a length in which the third biasing spring 63 can be disposed.

The cap 36 attached to the valve member 30 can be disposed inside the through hole 41*a* of the fixed core 41. The cap 36 includes, for example, a cylindrical portion 37 fitted with the protrusion 34, and a bottom 38 that closes the opening of the cylindrical portion 37 on the fuel introduction port 11*a* (see FIG. 1) side (in FIG. 2, the upper side) and protrudes radially outward from the cylindrical portion 37. The bottom 38 of the cap 36 is provided with a through hole 38*b* that penetrates the bottom 38 and communicates the inside and outside of the cap 36. The through hole 38*b* functions as an air vent hole when the cap 36 is press-fitted into the protrusion 34 of the valve member 30, and facilitates the press-fitting operation of the cap 36 into the protrusion 34. For example, the cap 36 is attached so that a tip surface 34*a* of the protrusion 34 of the valve member 30 abuts on a bottom surface 38*a* of the bottom 38 to close the through hole 38*b*.

A first outer surface 38*c* of the bottom 38 of the cap 36 facing the fuel introduction port 11*a* side (in FIG. 2, the upper side) constitutes a spring seat on one side of the first biasing spring 61. An annular second outer surface 38*d* of the bottom 38 facing the side opposite to a first outer surface 83*c* constitutes a spring seat on the other side of the third biasing spring 63. That is, the cap 36 receives the biasing force of the first biasing spring 61 toward the valve body 32 side (in the valve closing direction), and receives the biasing force of the third biasing spring 63 toward the fuel introduction port 11*a* side (in the valve opening direction). As described above, since the biasing force of the first biasing spring 61 is larger than the biasing force of the third biasing spring 63, the cap 36 is constantly pressed against the protrusion 34 by the difference between the biasing forces of the first biasing spring 61 and the third biasing spring 63. Therefore, since the force in the direction in which the cap 36 comes out of the protrusion 34 does not act, it is sufficient to press-fit and fix the cap to the protrusion 34, and it is not necessary to weld the cap.

The movable core 42 has a first end surface 42*a* (in FIG. 2, the upper end surface) facing the fixed core 41 side (in FIG. 2, the upper side) and a second end surface 42*b* (in FIG. 2, the lower end surface) facing the side opposite to the first end surface 42*a* (in FIG. 2, the lower side). The movable core 42 is configured such that the first end surface 42*a* faces the end surface 41*b* (in FIG. 2, the lower end surface) of the fixed core 41 on the nozzle member 21 side (in FIG. 2, the lower side). When the valve member 30 is in the valve closed state, the first end surface 42*a* of the movable core 42 faces the end surface 41*b* of the fixed core 41 with a gap G1. The movable core 42 is configured such that the first end surface 42*a* collides with the end surface 41*b* of the fixed core 41 when being attracted toward the fixed core 41 by an electromagnetic attractive force. The second end surface 42*b* of the movable core 42 is a portion on which the other end portion (in FIG. 2, the upper end portion) of the second biasing spring 62 abuts, and constitutes a spring seat of the second biasing spring 62. The second end surface 42*b* faces the step surface between the large-diameter cylindrical portion 24 and the small-diameter cylindrical portion 23 of the nozzle holder 22, but does not come into contact with the step surface because the second biasing spring 62 is interposed between the second end surface 42*b* and the large-diameter cylindrical portion 24 (see FIG. 1).

In a central portion of the movable core 42 on the first end surface 42*a* side, for example, a recess 423 opened to the fixed core 41 side is formed. The recess 423 has an inner diameter and a height capable of housing the entire flange portion 33 of the valve member 30 and the entire gap forming member 50. A bottom surface 423*a* of the recess 423 is a portion that can be engaged with the engagement surface 33*a* (in FIG. 2, the lower end surface) of the flange portion 33 of the valve member 30 and can abut on a tip portion 52*a* of a peripheral wall portion 52 described later of the gap forming member 50.

The insertion hole 421 of the movable core 42 is a hole penetrating from the bottom surface 423*a* to the second end surface 42*b* of the recess 423. A hole diameter of the insertion hole 421 is smaller than an outer diameter of the flange portion 33 of the valve rod portion 31, and is set to a size that allows the valve rod portion 31 to slide. That is, the inner peripheral surface forming the insertion hole 421 of the movable core 42 constitutes a sliding surface that slides relative to the outer peripheral surface of the valve rod portion 31. When the bottom surface 423*a* of the recess 423 is engaged with the engagement surface 33*a* of the flange portion 33 of the valve member 30, the movable core 42 moves in cooperation with the valve member 30 at the time of the valve opening operation for shifting from the valve closed state to the valve open state or at the time of the valve closing operation for shifting from the valve open state to the valve closed state. When the force for moving the movable core 42 downward or the force for moving the valve member 30 upward acts independently, the movable core 42 moves so as to be relatively displaced with respect to the valve member 30.

The gap forming member 50 is a bottomed cylindrical body having an internal space 50*a* that can accommodate the entire flange portion 33 of the valve member 30 as an engagement portion with respect to the movable core 42. The gap forming member 50 includes a bottom 51 having a bottom surface 51*a* that can be brought into contact with the contact surface 33*b* (in FIG. 2, the upper end surface) of the flange portion 33 of the valve member 30, and a peripheral wall portion 52 rising from an outer peripheral edge portion of the bottom 51 and opening to the movable core 42 side (in FIG. 2, the lower side). An outer surface 51*b* (in FIG. 2, the upper surface) of the bottom 51 is a portion on which the one end portion (in FIG. 2, the lower end portion) of the third biasing spring 63 abuts, and constitutes a spring seat on one side of the third biasing spring 63. In the gap forming member 50, the opening of the peripheral wall portion 52 faces the movable core 42 side, and the opening side end portion (tip portion) 52*a* of the peripheral wall portion 52 is a contact portion capable of abutting on the bottom surface 423*a* of the recess 423 of the movable core 42. An insertion hole 53 through which the protrusion 34 of the valve member 30 can be inserted is formed in the bottom 51, and a cylindrical inclination regulating portion 54 extending from an opening edge of the insertion hole 53 to the side opposite to the peripheral wall portion 52 is provided. The inner diameters of the insertion hole 53 and the inclination regulating portion 54 of the gap forming member 50 are set to be smaller than the outer diameter of the flange portion 33 of the valve member 30. The inclination regulating portion 54 is slidably formed on the outer peripheral surface of the protrusion 34 of the valve member 30, and regulates inclination of the gap forming member 50 with respect to the valve member 30. As a result, it is possible to suppress occurrence of deviation in the prestroke amount due to inclination of the gap forming member 50 with respect to the valve member 30. The gap forming member 50 is a member having a plastic deformation load smaller than that of the valve member 30, and is formed of, for example, an austenitic steel material.

The internal space of the gap forming member 50 is formed such that a height Hs (a length dimension from the bottom surface 51*a* to the opening side tip of the peripheral wall portion 52) is larger than a height Hc of the flange portion 33 (a length dimension between the engagement surface 33*a* and the contact surface 33*b* of the flange portion 33), and an inner diameter thereof (an inner diameter of the peripheral wall portion 52) is larger than an outer diameter of the flange portion 33. The gap forming member 50 is configured such that the opening side end portion 52*a* (contact portion) of the peripheral wall portion 52 abuts on the movable core 42 in a state of being positioned on the contact surface 33*b* (reference position) of the flange portion 33 of the valve member 30, thereby forming a gap G2 defining the prestroke between the engagement surface 33*a* (engagement portion) of the flange portion 33 of the valve member 30 and the bottom surface 423*a* (engagement portion) of the recess 423 of the movable core 42. That is, the magnitude of the prestroke (prestroke amount) is a dimension D2 obtained by subtracting the height dimension Hc of the flange portion 33 from the height dimension Hs of the internal space 50*a* of the gap forming member 50. When the movable core 42 is displaced from the state illustrated in FIG. 2 toward the fixed core 41 until the gap G2 becomes 0, the valve member is not displaced and the valve closed state is maintained.

As illustrated in FIG. 2, when the valve member 30 is in the valve closed state and the movable core 42 is in the stationary state, the gap forming member 50 receives the biasing force of the third biasing spring 63 in the valve closing direction, and the bottom surface 51*a* abuts on the contact surface 33*b* (reference position) of the flange portion 33 of the valve member 30, thereby being positioned at the reference position (contact surface 33*b* of the flange portion 33) of the valve member 30. That is, the size (dimension) of the gap G3 between the bottom surface 51*a* of the gap forming member 50 and the contact surface 33*b* of the flange portion 33 of the valve member 30 is 0. On the other hand, the movable core 42 receives the biasing force of the second biasing spring 62, and the bottom surface 423*a* of the recess 423 of the insertion hole 421 abuts on the opening side end portion (tip portion) 52*a* of the peripheral wall portion 52 of the gap forming member 50. At this time, since the biasing force of the second biasing spring 62 is smaller than the biasing force of a third spring 134 and the height dimension Hs of the internal space 50*a* of the gap forming member 50 is larger than the height dimension Hc of the flange portion 33 of the valve member 30, the movable core 42 cannot push back the gap forming member 50 biased by the third biasing spring 63, and the bottom surface 423*a* of the movable core 42 is not engaged with the engagement surface 33*a* of the flange portion 33 of the valve member 30. That is, the size of the gap G2 between the bottom surface 423*a* of the movable core 42 and the engagement surface 33*a* of the flange portion 33 of the valve member 30 corresponds to the prestroke amount, and is the size D2 obtained by subtracting the height dimension Hc of the flange portion 33 from the height dimension Hc of the internal space 50*a* of the gap forming member 50. The prestroke amount D2 is set to be smaller than the size (dimension) D1 of the gap G1 between the first end surface 42*a* (collision surface) of the movable core 42 and the end surface 41*b* (collision surface) of the fixed core 41 (D2<D1).

The end surface 41*b* (collision surface) of the fixed core 41, the first end surface (collision surface) 42*a* of the movable core 42, the bottom surface 51*a* of the gap forming member 50, the engagement surface 33*a* of the flange portion 33 of the valve member 30, and the contact surface 33*b* may be plated in order to improve durability. For example, when relatively soft magnetic stainless steel is used for the movable core 42, durability and reliability can be secured by using hard chromium plating or electroless nickel plating.

However, the collision force at the contact portions 423*a* and 52*a* between the movable core 42 and the gap forming member 50 and the contact portions 33*b* and 51*a* between the flange portion 33 of the valve member 30 and the gap forming member 50 is considerably smaller than the collision force at the collision surfaces 41*b* and 42*a* between the fixed core 41 and the movable core 42. Therefore, the necessity of plating at the contact portions 423*a* and 52*a* between the movable core 42 and the gap forming member 50 and the contact portions 33*b* and 51*a* between the flange portion 33 of the valve member 30 and the gap forming member 50 is significantly smaller than the necessity of plating at the collision surfaces 41*b* and 42*a* between the fixed core 41 and the movable core 42.

When plating is applied to the contact portions 423*a* and 52*a* between the movable core 42 and the gap forming member 50 and the contact portions 33*b* and 51*a* between the flange portion 33 of the valve member 30 and the gap forming member 50, the prestroke amount is determined based on the dimension including the thickness of the plating.

The stroke adjustment of the movable portion including the valve member 30 and the movable core 42 is as follows. The movable core 42 is disposed in the large-diameter cylindrical portion 24 of the nozzle holder 22, and the electromagnetic coil 43 and the housing 44 are attached to the outer periphery of the large-diameter cylindrical portion 24. After the gap forming member 50 and the third biasing spring 63 are assembled to the protrusion 34 side of the valve member 30 in this order, the cap 36 is press-fitted into the protrusion 34 of the valve member 30. Next, the valve member 30 to which the member is assembled is inserted into the through hole 41*a* of the fixed core 41, and the valve rod portion 31 of the valve member 30 is inserted into the movable core 42. Then, the first biasing spring 61 and the adjuster 64 are attached to the through hole 41*a* of the fixed core 41 in this order. In this state, the valve member 30 is pressed to the valve closing position by a jig, and the press-fitting position of the nozzle member 21 is determined while the stroke of the valve member 30 is detected when the electromagnetic coil 43 is energized. Thus, the stroke of the movable core 42 is adjusted. For example, in a state where the initial load of the first biasing spring 61 is adjusted, the end surface 41*b* of the fixed core 41 is adjusted to face the first end surface 42*a* of the movable core 42 with the magnetic attraction gap G1 of about 70 to 150 μm interposed between them.

Figure 3:
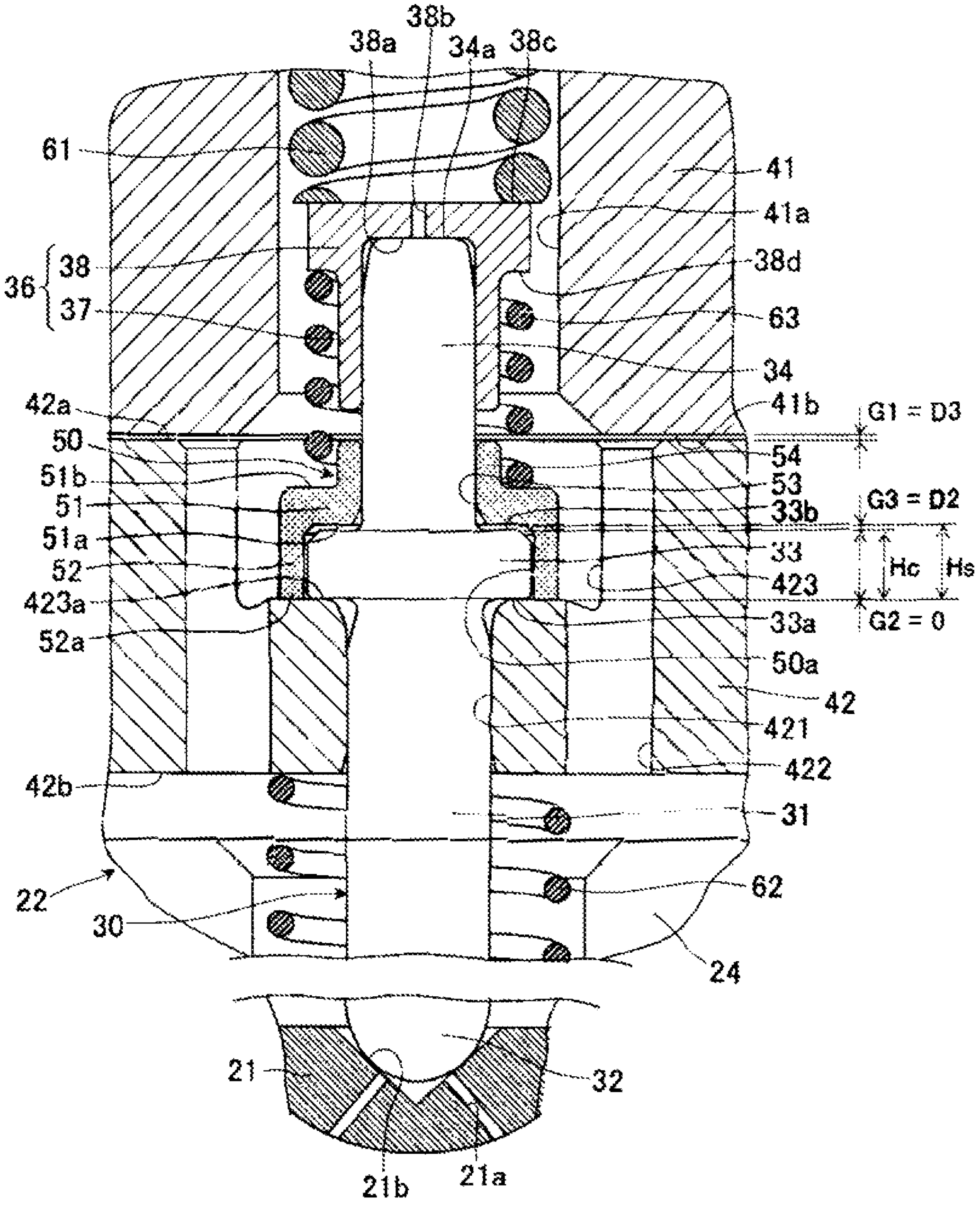
FIG. 3 is an enlarged view illustrating an initial state (a valve member is in a valve closed stationary state and movable core is displaced) in a valve opening operation of the fuel injection valve illustrated in FIG. 2.
Figure 4:
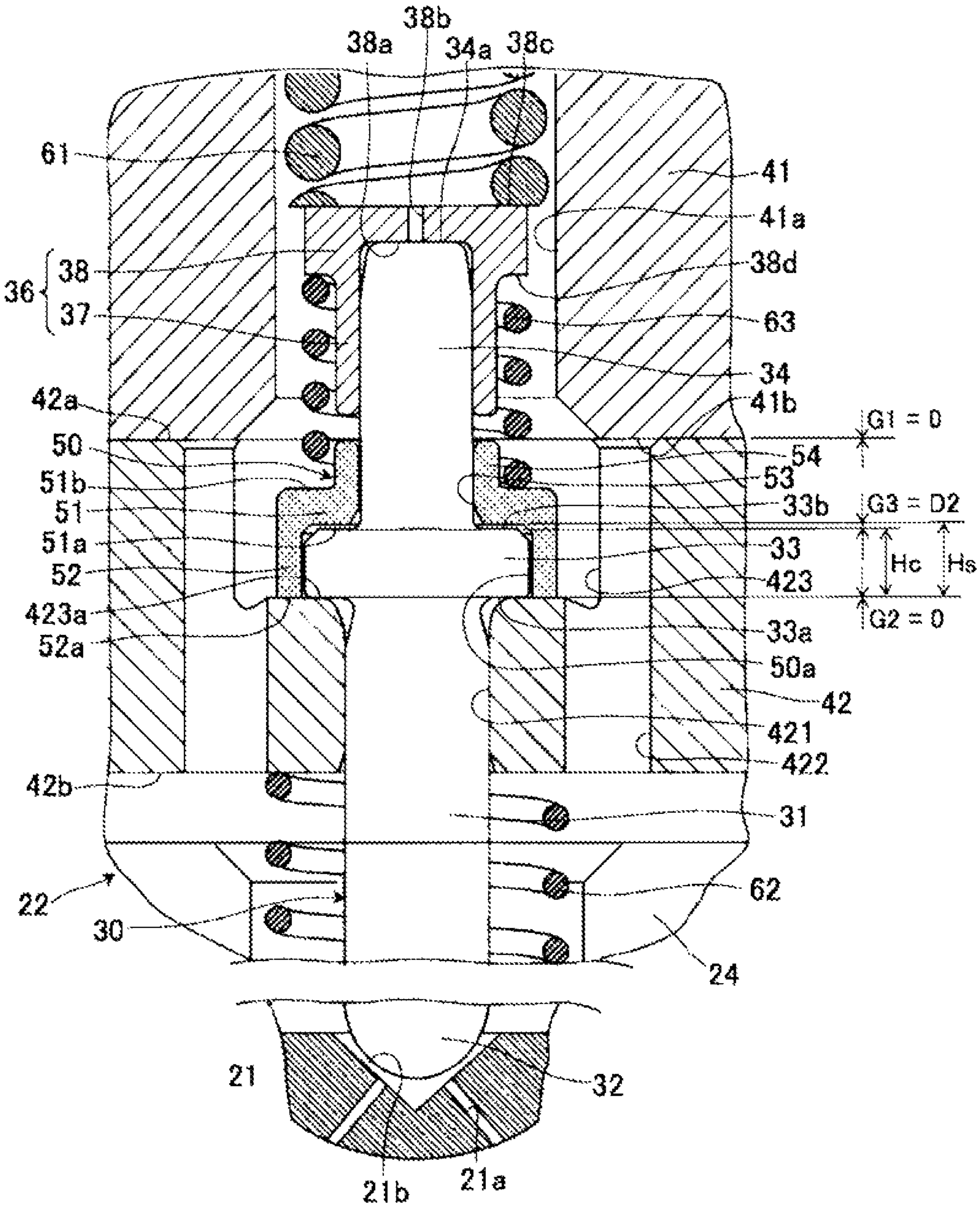
FIG. 4 is an enlarged view illustrating an intermediate state (the valve member and the movable core are displaced) in the valve opening operation of the fuel injection valve illustrated in FIG. 2.

Next, a valve opening operation of the fuel injection valve to which the prestroke adjustment method according to the first embodiment of the present invention is applied will be described with reference to FIGS. 1 to 4. FIG. 3 is an enlarged view illustrating an initial state (valve member is in the valve closed stationary state and the movable core is displaced) in the valve opening operation of the fuel injection valve illustrated in FIG. 2. FIG. 4 is an enlarged view illustrating an intermediate state (the valve member and the movable core are displaced) in the valve opening operation of the fuel injection valve illustrated in FIG. 2.

A drive current is supplied to the electromagnetic coil 43 illustrated in FIG. 1 via the conductor portion 47. Energization or de-energization of the electromagnetic coil 43 is controlled by a controller (not illustrated).

In a state where the electromagnetic coil 43 is not energized, as illustrated in FIG. 2, the valve body 32 of the valve member 30 abuts on the valve seat 21*b* by a force obtained by subtracting the biasing force of the third biasing spring 63 from the biasing force of the first biasing spring 61 and the second biasing spring 62, whereby the valve is closed.

At this time, the movable core 42 is stationary in a state where the bottom surface 423*a* of the recess 423 abuts on the tip portion 52*a* on the opening side of the peripheral wall portion 52 of the gap forming member 50. This state is referred to as a valve closed stationary state. In the valve closed stationary state, a gap G1 exists between the first end surface 42*a* (collision surface) of the movable core 42 and the end surface 41*b* (collision surface) of the fixed core 41. On the other hand, in the gap forming member 50, the tip portion 52*a* of the peripheral wall portion 52 is in contact with the bottom surface 423*a* of the recess 423 of the movable core 42, and the bottom surface 51*a* of the bottom 51 is in contact with the contact surface 33*b* of the flange portion 33 of the valve member 30. Therefore, a gap G2 exists between the engagement surface 33*a* of the flange portion 33 of the valve member 30 and the bottom surface 423*a* of the recess 423 of the movable core 42. At this time, the size (dimension) of the gap G1 is D1 (G1=D1), and the size (dimension) of the gap G2 is D2 (G2=D2). The magnitude (prestroke amount) of the prestroke is defined by the size (dimension) of the gap G2 between the engagement portion of the valve member 30 (the engagement surface 33*a* of the flange portion 33) and the engagement portion of the movable core 42 (the bottom surface 423*a* of the recess 423) in a state where the gap forming member 50 is positioned at the reference position of the valve member 30 (the contact surface 33*b* of the flange portion 33) and abuts on the movable core 42. Therefore, the size D2 of the gap G2 is the prestroke amount. Since the bottom surface 51*a* of the gap forming member 50 and the contact surface 33*b* of the flange portion 33 of the valve member 30 are in contact with each other, the size (dimension) of a gap G3 between the bottom surface 51*a* of the gap forming member 50 and the contact surface 33*b* of the flange portion 33 of the valve member 30 is 0.

When energization of the electromagnetic coil 43 illustrated in FIG. 1 is started, magnetic flux is generated in the fixed core 41 constituting the magnetic passage, the housing 44 as a yoke, and the movable core 42, and a magnetic attraction force acts between the end surface 41*b* of the fixed core 41 and the first end surface 42*a* of the movable core 42. When the magnetic attraction force becomes larger than the biasing force of the third biasing spring 63, the movable core 42 starts to be displaced toward the fixed core 41. At this time, since the gap forming member 50 is kept in contact with the movable core 42, the gap forming member is displaced toward the fixed core 41 as the movable core 42 is displaced toward the fixed core 41. On the other hand, the valve member 30 is not displaced by the biasing force of the first biasing spring 61, and a state in which the valve body 32 is in contact with the valve seat 21*b* is maintained.

In FIG. 3, when the movable core 42 is displaced toward the fixed core 41, the bottom surface 423*a* of the recess 423 of the movable core 42 is engaged with the engagement surface 33*a* of the flange portion 33 of the valve member 30. That is, the size (dimension) of the gap G2 between the engagement portion (bottom surface 423*a*) of the movable core 42 and the engagement portion (engagement surface 33*a* of the flange portion 33) of the valve member 30 is 0 (G2=0). At this time, the movable core 42 is engaged with the flange portion 33 of the valve member 30 with a certain speed by displacing the approach distance corresponding to the size of the gap G2 in the valve closed stationary state without accompanying the valve member 30. Since the gap G2 in the valve closed stationary state has the necessary prestroke amount D2, the valve member 30 can be quickly lifted when the movable core 42 is engaged with the flange portion 33 of the valve member 30, and as a result, the valve opening operation of the valve body 32 is quickly started.

The gap G3 is formed between the bottom surface 51*a* of the gap forming member 50 and the contact surface 33*b* of the flange portion 33 of the valve member 30 by the gap forming member 50 being displaced toward the fixed core 41 as the movable core 42 is displaced toward the fixed core 41. At this time, in a state where the tip portion 52*a* of the peripheral wall portion 52 of the gap forming member 50 on the opening side and the bottom surface 423*a* of the movable core 42 are in contact with each other, the bottom surface 423*a* of the movable core 42 is engaged with the engagement surface 33*a* of the flange portion 33 of the valve member 30, and thus, the size (dimension) of the gap G3 is D2 which is the same as the prestroke amount (G3=D2). The prestroke amount matches to a dimension obtained by subtracting the height dimension Hc of the flange portion 33 of the valve member 30 from the height dimension Hs of the internal space 50*a* of the gap forming member 50. That is, the prestroke amount corresponds to a size (dimension) in which the valve member 30 and the movable core 42 can be relatively displaced in a state where the tip portion 52*a* of the peripheral wall portion 52 of the gap forming member 50 on the opening side is in contact with the bottom surface 423*a* of the movable core 42.

As the movable core 42 is displaced toward the fixed core 41, the size of the gap G1 between the first end surface 42*a* of the movable core 42 and the end surface 41*b* of the fixed core 41 is reduced accordingly. The size (dimension) of the gap G1 is D3 which is a size obtained by subtracting the prestroke amount D2 from D1 in the valve closed stationary state (G1=D3<D1).

When the movable core 42 is engaged with the flange portion 33 of the valve member 30, the propulsion force of the movable core 42 in the valve opening direction is larger than the biasing force of the first biasing spring 61 by the magnetic attraction force generated by the energization of the electromagnetic coil 43 and the kinetic energy of the movable core 42 by the acceleration corresponding to the approach distance of the prestroke amount D2. Therefore, as illustrated in FIG. 4, the movable core 42 moves toward the fixed core 41 together with the valve member 30 and the gap forming member 50. As a result, the valve body 32 of the valve member 30 is spaced from the valve seat 21*b*, so that the valve is opened.

FIG. 4 illustrates a moment when the first end surface 42*a* of the movable core 42 collides with the end surface 41*b* of the fixed core 41. In this case, the size of the gap G1 between the first end surface 42*a* of the movable core 42 and the end surface 41*b* of the fixed core 41 is 0 (G1=0). A state in which the tip portion 52*a* (contact portion) of the peripheral wall portion 52 of the gap forming member 50 on the opening side is in contact with the bottom surface 423*a* of the recess 423 of the movable core 42 is maintained, and a state in which the engagement portion of the valve member 30 (the engagement surface 33*a* of the flange portion 33) is engaged with the engagement portion of the movable core 42 (the bottom surface 423*a* of the recess 423) is maintained. Therefore, the size (dimension) of the gap G2 between the engagement surface 33*a* of the flange portion 33 of the valve member 30 and the bottom surface 423*a* of the movable core 42 is 0 (G2=0), and the size (dimension) of the gap G3 between the bottom surface 51*a* of the gap forming member 50 and the contact surface 33*b* of the flange portion 33 of the valve member 30 is the prestroke amount D2 (G3=D2).

Thereafter, the valve member 30 is further displaced in a direction away from the movable core 42 by the kinetic energy of the valve member 30. That is, the engagement between the engagement portion of the valve member 30 (the engagement surface 33*a* of the flange portion 33) and the engagement portion of the movable core 42 (the bottom surface 423*a* of the recess 423) is released. Therefore, the valve open state of the valve member 30 is maintained.

As described above, in the fuel injection valve 1, in a state where the gap forming member 50 is positioned at the reference position of the valve member 30 and abuts on the movable core 42, the gap G2 is formed between the engagement portion of the flange portion 33 of the valve member 30 (the engagement surface 33*a* of the flange portion 33) and the engagement portion of the movable core 42 (the bottom surface 423*a* of the recess 423). This gap G2 defines the prestroke. Since the fuel injection valve 1 includes the prestroke, the movable core 42 can acquire kinetic energy by the approach by the prestroke amount before being engaged with the valve member 30. As a result, when the movable core 42 is engaged with the valve member 30, the movable core 42 can quickly lift the valve member 30, so that a quick valve opening operation of the valve body 32 can be performed, and the responsiveness of the valve opening operation is improved.

When the prestroke amount is too small, the kinetic energy of the movable core 42 is too low to be used for the valve opening operation, and the valve cannot be opened under a high pressure condition (for example, 25 MPa or more). Conversely, when the prestroke amount is excessive, the action of the magnetic attraction force on the movable core 42 becomes weak, the movable core 42 is not attracted toward the fixed core 41, and the valve cannot be opened. For this reason, the allowable range of the variation in the prestroke amount is narrowed to ±several tens of μm.

As described above, the prestroke amount is defined by the dimensional difference between the two components of the gap forming member 50 and the valve member 30. More specifically, a size obtained by subtracting the height dimension Hc of the flange portion 33 of the valve member 30 from the height dimension Hs of the internal space 50*a* of the gap forming member 50 corresponds to the prestroke amount D2.

For this reason, it is conceivable to set the dimensional tolerance of each of the components 30 and 50 to ±several μm in order to keep the variation in the prestroke amount within the above-described allowable range. However, it is difficult to manufacture the components 30 and 50 with such dimensional tolerances from the viewpoint of machining accuracy and cost of the machine tool. On the other hand, when the two components 30 and 50 machined with machining accuracy lower than ±several μm are arbitrarily assembled, the variation in the prestroke amount may exceed the above-described allowable range. Therefore, it is conceivable to actually measure all the dimensions of the large number of two components 30 and 50, and select and combine the two components 30 and 50 so that the variation in the prestroke amount falls within the allowable range. However, in this case, many man-hours are required, and there is a problem that the cost increases.

Therefore, in the prestroke adjustment method of the fuel injection valve 1 according to the present embodiment, the variation in the prestroke amount defined by the dimensional difference between the two components of the gap forming member 50 and the valve member 30 can be kept within a predetermined allowable range without being affected by the machining accuracy of the components 30 and 50.

Figure 5:
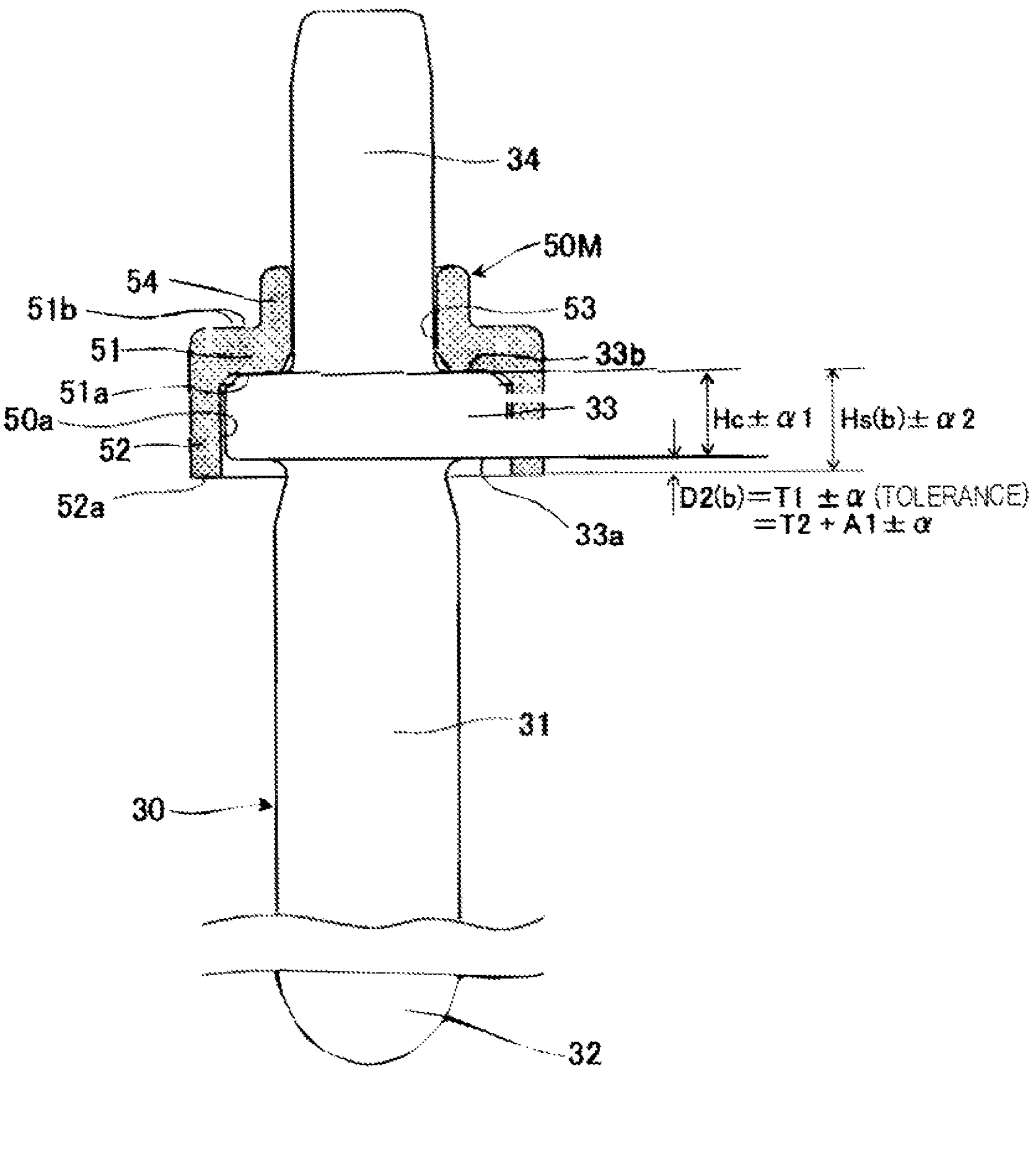
FIG. 5 is an explanatory diagram illustrating a first stage of the prestroke adjustment method of the fuel injection valve according to the first embodiment of the present invention.
Figure 6:
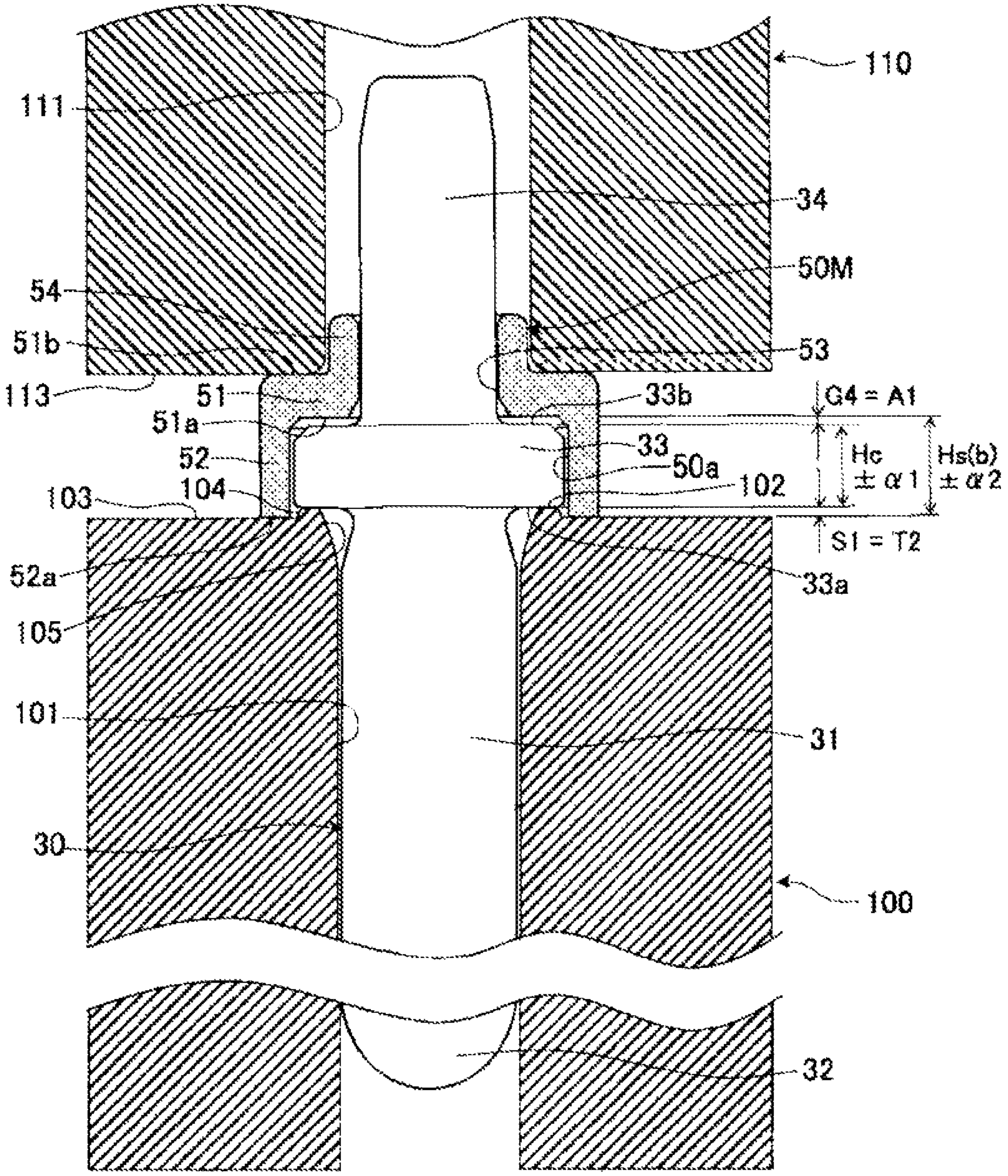
FIG. 6 is an explanatory diagram illustrating a second stage of the prestroke adjustment method of the fuel injection valve according to the first embodiment of the present invention.
Figure 7:
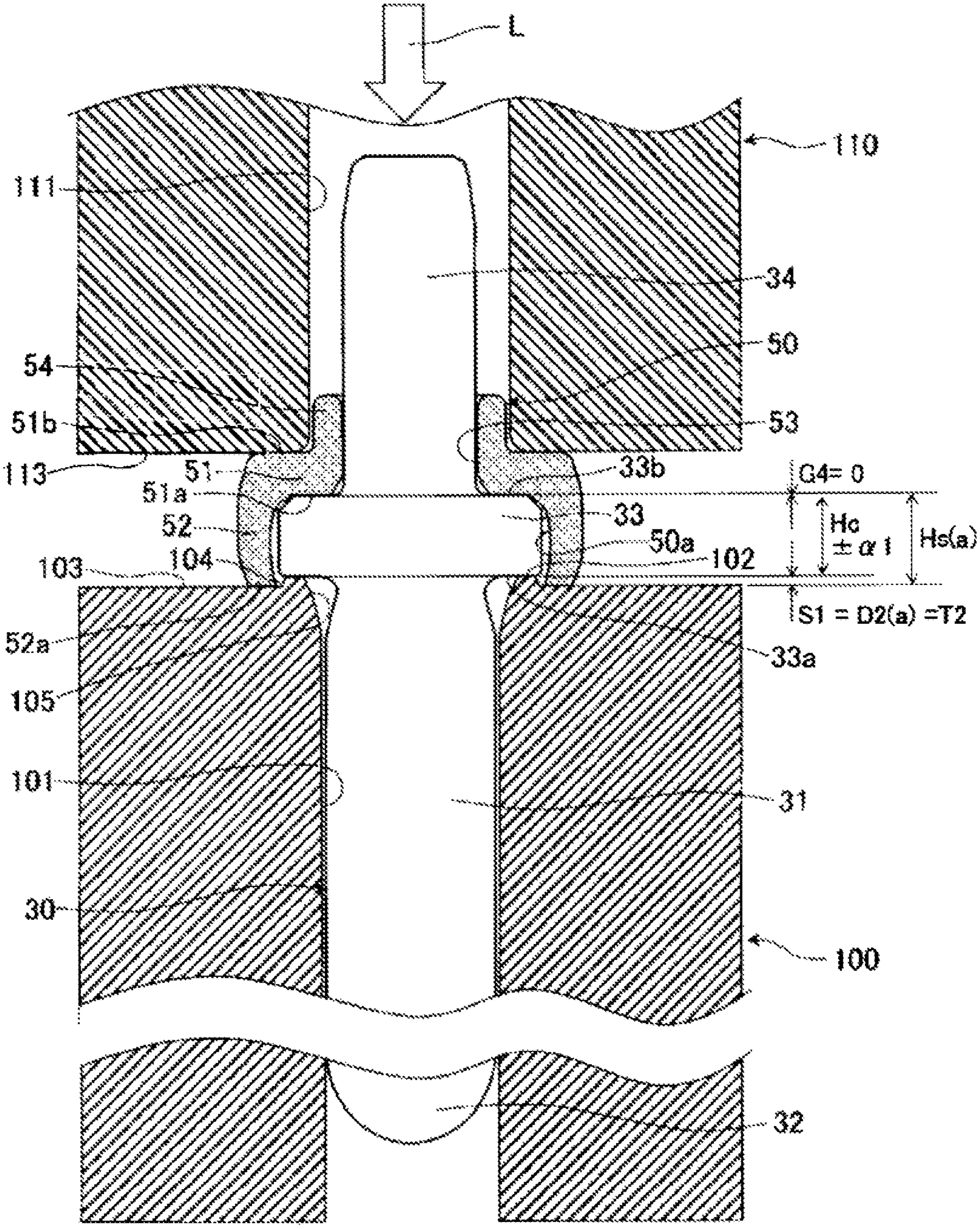
FIG. 7 is an explanatory diagram illustrating a third stage of the prestroke adjustment method of the fuel injection valve according to the first embodiment of the present invention.

Next, a prestroke adjustment method of the fuel injection valve according to the first embodiment of the present invention will be described with reference to FIGS. 5 to 7. FIG. 5 is an explanatory diagram illustrating a first stage of the prestroke adjustment method of the fuel injection valve according to the first embodiment of the present invention. FIG. 6 is an explanatory diagram illustrating a second stage of the prestroke adjustment method of the fuel injection valve according to the first embodiment of the present invention. FIG. 7 is an explanatory diagram illustrating a third stage of the prestroke adjustment method of the fuel injection valve according to the first embodiment of the present invention.

In the prestroke adjustment method for the fuel injection valve 1 according to the present embodiment, the prestroke amount D2 (see FIG. 2) corresponding to a dimension obtained by subtracting the height dimension Hc (distance from the engagement surface 33*a* to the contact surface 33*b*) of the flange portion 33 of the valve member 30 from the height dimension Hs (distance from the bottom surface 51*a* to the opening side end portion 52*a*) of the internal space 50*a* of the gap forming member 50 is adjusted to fall within a predetermined allowable range. As illustrated in FIG. 7, a feature of the prestroke adjustment method according to the present embodiment is that a load L in a direction from the bottom surface 51*a* toward the flange portion 33 (reference position) of the valve member 30 is applied to the gap forming member 50 assembled to the valve member 30 to plastically deform the gap forming member, and a dimensional difference at a predetermined position between two components of the gap forming member 50 and the valve member 30 is shortened, so that the prestroke amount D2 corresponding to the dimensional difference is set to a target value T2 that can be expected to improve the responsiveness of the valve opening operation. A specific procedure of the prestroke adjustment method is as follows.

First, the gap forming member 50 has an adjustment margin A1 before the adjustment of the prestroke amount. That is, a gap forming member 50M (an intermediate material having a predetermined portion larger in dimension than the gap forming member 50 as a final component after the prestroke adjustment) having the adjustment margin A1 and the valve member 30 having no adjustment margin as a final component are prepared. The valve member 30 and the gap forming member 50M as an intermediate material are processed with predetermined machining accuracy. The machining accuracy may be low. At this time, both the valve member 30 and the gap forming member 50M as an intermediate material have variations in component dimensions due to machining accuracy.

In FIG. 5, the gap forming member 50M is an intermediate material having the adjustment margin A1 before the prestroke amount is adjusted. The gap forming member 50M is positioned at the reference position with the bottom surface 51*a* of the bottom 51 abutting on the contact surface 33*b* of the flange portion 33 of the valve member 30. A dimensional difference obtained by subtracting the height dimension Hc of the flange portion 33 of the valve member 30 from the height dimension Hs(b) of the internal space 50*a* of the gap forming member 50M as an intermediate material corresponds to the prestroke amount D2(*b*) before adjustment. The magnitude of the prestroke amount D2(*b*) before adjustment is defined as T1. At this time, the prestroke amount D2(*b*) before adjustment has a dimensional tolerance ±α due to the machining accuracy of the gap forming member 50M and the valve member 30. That is, D2(*b*)=T1±α.

The prestroke amount D2(*b*) before adjustment is finally set to the target value T2 from T1. Therefore, the height Hs(b) of the internal space 50*a* of the gap forming member 50M as an intermediate material is set such that the prestroke amount D2(*b*) before adjustment becomes a value obtained by adding the adjustment margin A1 to the target value T2. At this time, the dimensions of the processed valve member 30 and the gap forming member 50M as an intermediate material have dimensional tolerances due to machining accuracy. That is, D2(*b*)=T1±α=T2+A1±α. Finally, by plastically deforming the gap forming member 50M, the height dimension Hs(b) of the internal space 50*a* before adjustment is shortened by the adjustment margin A1, so that the prestroke amount D2 is set to the target value T2.

Secondly, as illustrated in FIG. 6, the gap forming member 50M as an intermediate material is set between a first jig 100 and a second jig 110 in a state of being assembled to the valve member 30. Specifically, the valve member 30 and the gap forming member 50M as an intermediate material are disposed above the first jig 100, and the second jig 110 is disposed above the first jig 100 so as to sandwich the valve member 30 and the intermediate gap forming member 50M.

The first jig 100 has an insertion hole 101 through which the valve rod portion 31 of the valve member 30 can be inserted. The diameter of the insertion hole 101 is set to be smaller than the outer diameter of the flange portion 33 of the valve member 30 and slightly larger than the valve rod portion 31.

The first jig 100 has an annular contact surface 102 abutting on the engagement surface 33*a* of the flange portion 33 of the valve member 30 at the opening edge portion of the insertion hole 101, and has a first pressing surface 103 on which the tip portion 52*a* of the peripheral wall portion 52 of the gap forming member 50 abuts on the outer peripheral side of the contact surface 102. The contact surface 102 is formed at a position higher than the first pressing surface 103 by the target value T2 of the prestroke amount D2. That is, the contact surface 102 forms a step S1 having a height corresponding to the target value T2 of the prestroke amount D2 with respect to the first pressing surface 103. The area of the contact surface 102 on which the engagement surface 33*a* of the flange portion 33 of the valve member 30 abuts is set to such a size that stress causing plastic deformation of the flange portion 33 due to application of a load described later is not generated. The prestroke adjustment method according to the present embodiment does not plastically deform the flange portion 33 of the valve member 30.

The dimensional accuracy of the step S1 of the first jig 100 is strictly controlled with high accuracy, and is higher than the dimensional tolerance of the valve member 30 and the gap forming member 50M as an intermediate material. Therefore, the error in the height dimension of the step S1 with respect to the first pressing surface 103 of the contact surface 102 is negligible as compared with the dimensional tolerance of the valve member 30 and the gap forming member 50M as an intermediate material. That is, S1=T2. The height dimension of the step S1 forms a prestroke corresponding to a dimensional difference between the two components.

The contact surface 102 and the first pressing surface 103 are connected by a first tapered portion 104. The connection portion between the first tapered portion 104 and the first pressing surface 103 is located inside the inner peripheral surface of the peripheral wall portion 52 of the gap forming member 50M as an intermediate material. The inner peripheral surface forming the insertion hole 101 and the contact surface 102 are connected by a second tapered portion 105. The second tapered portion 105 has a function of guiding insertion of the valve body 32 and the valve rod portion 31 of the valve member 30 into the insertion hole 101.

The second jig 110 has a fitting hole 111 into which the inclination regulating portion 54 of the gap forming member 50M as an intermediate material can be inserted. The diameter of the fitting hole 111 is set to be smaller than the outer diameter of the peripheral wall portion 52 of the gap forming member 50M as an intermediate material and slightly larger than the outer diameter of the inclination regulating portion 54. The second jig 110 has a second pressing surface 113 in contact with the outer surface 51*b* of the bottom 51 of the gap forming member 50M as an intermediate material.

With respect to the first jig 100 having such a configuration, the valve rod portion 31 of the valve member 30 is inserted into the insertion hole 101, and the engagement surface 33*a* of the flange portion 33 of the valve member 30 is brought into contact with the contact surface 102 of the stepped portion. At this time, in the gap forming member 50M as an intermediate material assembled to the valve member 30, the tip portion 52*a* on the opening side of the peripheral wall portion 52 abuts on the first pressing surface.

As described above, in a state where the valve member 30 and the gap forming member 50M as an intermediate material are set in the first jig 100, a gap G4 is formed between the bottom surface 51*a* of the gap forming member 50M as an intermediate material and the contact surface 33*b* of the flange portion 33 of the valve member 30. The size of the gap G4 corresponds to the adjustment margin A1 of the prestroke (G4=A1).

Third, as shown in FIG. 7, the gap forming member 50M as an intermediate material is sandwiched between the first jig 100 and the second jig 110 in a state of being assembled to the valve member 30, and a load L (load exceeding the yield point of the gap forming member 50M) is applied to the gap forming member 50M as an intermediate material in the height direction (in FIG. 7, the vertical direction) of the internal space 50*a*, thereby plastically deforming the gap forming member 50M as an intermediate material. The first jig 100 and the second jig 110 are configured to have strength not to be plastically deformed when a load is applied to the gap forming member 50.

Specifically, the gap forming member 50 (peripheral wall portion 52) is plastically deformed until the bottom surface 51*a* of the internal space 50*a* of the gap forming member 50 comes into contact with the contact surface 33*b* of the flange portion 33 of the valve member 30. As a result, the size of the gap G4 between the bottom surface 51*a* of the gap forming member 50 and the contact surface 33*b* of the flange portion 33 becomes 0 from the adjustment margin A1 (G4=0). On the other hand, since the first jig 100 is not deformed, the size of the step S1 of the contact surface 102 of the first jig 100 with respect to the first pressing surface 103 is unchanged at the target value T2 of the prestroke amount. As a result, the height dimension Hs(a) of the internal space 50*a* after adjustment is shortened by the adjustment margin A1 from the height dimension Hs(b) of the internal space 50*a* before adjustment. Therefore, the prestroke amount D2(*a*) corresponding to a dimension obtained by subtracting the height dimension Hc of the flange portion 33 of the valve member 30 from the height dimension Hs(a) of the internal space 50*a* of the gap forming member 50 becomes the target value T2.

At this time, since the peripheral wall portion 52 of the gap forming member 50 expands in the radial direction by plastic deformation, the inner diameter of the peripheral wall portion 52 is larger than the inner diameter of the gap forming member 50M as an intermediate material. The tip portion 52*a* of the peripheral wall portion 52 of the gap forming member 50 on the opening side is pressed against the first pressing surface 103 of the first jig 100 and plastically deformed, whereby the tool mark is crushed. As a result, the surface roughness of the tip portion 52*a* of the gap forming member 50 is improved, and the durability is improved since the tip portion is machined and hardened by plastic deformation.

Depending on the machining accuracy of the gap forming member 50 and the valve member 30, the bottom surface 51*a* of the gap forming member 50 may be formed in a state of being somewhat inclined with respect to the contact surface 33*b* of the flange portion 33 of the valve member 30. However, in the present embodiment, since the gap forming member 50M as an intermediate material is plastically deformed until the bottom surface 51*a* of the gap forming member 50 abuts on the contact surface 33*b* of the flange portion 33 of the valve member 30, the contact portion of the contact surface 33*b* of the flange portion 33 in the bottom surface 51*a* of the gap forming member 50 after plastic deformation is in a deformed state following the shape of the contact surface 33*b*. Therefore, the collision area between the bottom surface 51*a* of the gap forming member 50 and the contact surface 33*b* of the flange portion 33 of the valve member 30 can be maximized. As a result, it is possible to reduce the stress at the time of collision between both components generated on the bottom surface 51*a* of the gap forming member 50 and the flange portion 33 of the valve member 30, and the durability of both components 30 and 50 is improved.

As described above, the prestroke adjustment method of the fuel injection valve 1 according to the first embodiment of the present invention is to adjust the prestroke amount D2 of the fuel injection valve 1 which includes the valve member 30 having the valve body 32 at the tip portion which can be seated on and separated from the valve seat 21*b*, the movable core 42 (movable element) that can be relatively displaced in the valve opening/closing direction with respect to the valve member 30 and can be engaged with the valve member 30, and the gap forming member 50 that is configured to be relatively displaceable in the valve opening/closing direction with respect to the valve member 30 and the movable core 42 (movable element) and forms the gap G2 defining a prestroke between the engagement portion 33*a* and 423*a* of the valve member 30 and the movable core 42 (movable element) by the second portion 52*a* in contact with the movable core 42 (movable element) in a state where the first portion 51*a* is positioned at the reference position 33*b* of the valve member 30. The gap forming member 50 has the adjustment margin A1 before the adjustment of the prestroke amount D2. In the prestroke adjustment method, the load L in a direction from the first portion 51*a* toward the reference position 33*b* of the valve member 30 is applied to the gap forming member 50 in a state of being assembled to the valve member 30, and the gap forming member 50 is plastically deformed, so that a relative length (height dimension Hs of the internal space) between the first portion 51*a* and the second portion 52*a* is shortened, and the prestroke amount D2 is set to the target value T2.

According to this method, by plastically deforming the gap forming member 50 assembled to the valve member 30, the dimensional difference (corresponding to the prestroke amount) at the predetermined position between the two components of the valve member 30 and the gap forming member 50 can be shortened to the target value T2. Therefore, even if the two components 30 and 50 have a large dimensional tolerance due to the machining accuracy, the influence of the dimensional tolerance on the dimensional difference at the predetermined position between the two components 30 and 50 after adjustment can be reduced. That is, the variation in the prestroke amount D2 can be reduced regardless of the machining accuracy of the components 30 and 50.

In the prestroke adjustment method according to the present embodiment, the load L is applied to the gap forming member 50 by sandwiching the gap forming member 50 assembled to the valve member 30 between the first jig 100 and the second jig 110.

According to this method, it is possible to adjust the dimensional difference (corresponding to the prestroke amount D2) at a predetermined position between the two components 30 and 50 only by simply sandwiching the two components of the valve member 30 and the gap forming member 50 by the two jigs 100 and 110 without following a complicated procedure. Therefore, the adjustment of the prestroke amount D2 can be easily executed.

In the prestroke adjustment method according to the present embodiment, the first jig 100 has the contact surface 102 on which the engagement surface 33*a* (the engagement portion or the first side portion) of the flange portion 33 of the valve member 30 abuts and the first pressing surface 103 on which the opening side end portion 52*a* (the second portion) of the gap forming member 50 abuts. The contact surface 102 forms a step S1 having a height corresponding to the target value T2 of the prestroke amount with respect to the first pressing surface 103. The plastic deformation of the gap forming member 50 is performed until the bottom surface 51*a* (first portion) of the gap forming member 50 comes into contact with the contact surface 33*b* (the reference position or the second side portion) of the flange portion 33 of the valve member 30 in a state where the engagement surface 33*a* (the engagement portion or the first side portion) of the flange portion 33 of the valve member 30 is in contact with the contact surface 102 of the first jig 100 and in a state where the opening side end portion 52*a* (second portion) of the gap forming member 50 is in contact with the first pressing surface 103 of the first jig 100.

According to this method, by only plastically deforming the gap forming member 50 until the bottom surface 51*a* (first portion) of the gap forming member 50 comes into contact with the contact surface 33*b* (the reference position or the second side portion) of the flange portion 33 of the valve member 30, a gap having a height of the step S1 of the first jig can be formed between the opening side end portion 52*a* (second portion) of the gap forming member 50 and the engagement surface 33*a* (the engagement portion or the first side portion) of the flange portion 33 of the valve member 30. Therefore, it is possible to adjust the prestroke amount D2 according to the accuracy of the height dimension of the step S1 of the first jig without being affected by the machining accuracy of the two components of the gap forming member 50 and the valve member 30. Therefore, it is possible to easily reduce the variation in the prestroke amount D2 without being affected by the machining accuracy of the components 30 and 50.

In the fuel injection valve 1 using the prestroke adjustment method of the present embodiment, the valve member 30 includes the valve rod portion 31 in which the valve body 32 is provided at one end portion and extends in the valve opening/closing direction, and the flange portion 33 provided at the other end portion of the valve rod portion 31 and protruding radially outward from the valve rod portion 31. In the flange portion 33, the engagement surface 33*a* (first side portion) facing the valve body 32 side constitutes an engagement portion with respect to the movable core 42 (movable element), and the contact surface 33*b* (second side portion) facing the opposite side to the valve body 32 side constitutes a reference position. The gap forming member 50 has the internal space 50*a* capable of accommodating the flange portion 33, and is a bottomed cylindrical body opened to the movable core 42 (movable element) side. The height dimension Hs from the bottom surface 51*a* of the internal space 50*a* of the gap forming member 50 to the opening end is set to be larger than the height dimension Hc from the engagement surface 33*a* (first side portion) of the flange portion 33 to the contact surface 33*b* (second side portion). In the gap forming member 50, the bottom surface 51*a* constitutes the first portion, and the opening side end portion 52*a* constitutes the second portion. The plastic deformation of the gap forming member 50 is performed until the bottom surface 51*a* of the gap forming member 50 comes into contact with the contact surface 33*b* (second side portion) of the flange portion 33 in a state where the gap forming member 50 and the valve member 30 are arranged such that the dimensional difference between the opening side end portion 52*a* of the gap forming member 50 and the engagement surface 33*a* (first side portion) of the flange portion 33 of the valve member 30 becomes the target value T2 of the prestroke amount D2.

According to this configuration, by only plastically deforming the gap forming member 50 until the bottom surface 51*a* of the gap forming member 50 comes into contact with the contact surface 33*b* of the flange portion 33 of the valve member 30, the dimensional difference (corresponding to the prestroke amount D2) between the opening side end portion 52*a* of the gap forming member 50 and the engagement surface 33*a* of the flange portion 33 of the valve member 30 can be set to the target value T2. Therefore, the prestroke amount D2 can be adjusted to the target value without being affected by the machining accuracy of the two components of the gap forming member 50 and the valve member 30. Therefore, it is possible to easily reduce the variation in the prestroke amount D2 without being affected by the machining accuracy of the components 30 and 50.

In the prestroke adjustment method according to the present embodiment, the first jig 100 has the insertion hole 101 through which the valve body 32 and the valve rod portion 31 of the valve member 30 can be inserted, and the contact surface 102 of the first jig 100 is formed at the opening edge portion of the insertion hole 101. When the load L is applied to the gap forming member 50, the valve member 30 has the flange portion 33 in contact with the contact surface 102 of the first jig 100 in a state where the valve body 32 and the valve rod portion 31 are inserted into the insertion hole 101 of the first jig 100.

According to this configuration, the valve member 30 can be easily positioned with respect to the first jig 100, and the positional displacement of the valve member 30 and the gap forming member 50 can be suppressed when the load L is applied to the gap forming member 50.

In the prestroke adjustment method according to the present embodiment, the valve member 30 includes the protrusion 34 extending from the flange portion 33 to the opposite side of the valve rod portion 31, and the gap forming member 50 includes the cylindrical inclination regulating portion 54 slidable on the protrusion 34 of the valve member 30. The second jig 110 has the fitting hole 111 into which the inclination regulating portion 54 can be fitted, and has the second pressing surface 113 in contact with the bottom 51 of the gap forming member 50 on the outer peripheral side of the fitting hole 111. The load L is applied to the gap forming member 50 by bringing the second pressing surface 113 of the second jig 110 into contact with the bottom 51 of the gap forming member 50 in a state where the fitting hole 111 of the second jig 110 is fitted to the inclination regulating portion 54 of the gap forming member 50.

According to this configuration, positioning of the second jig 110 with respect to the valve member 30 and the gap forming member 50 becomes easy. Further, when the load L is applied to the gap forming member 50, the inclination of the gap forming member 50 with respect to the valve member 30 is suppressed, so that the load L can be applied to the gap forming member 50 in an appropriate direction, and the prestroke amount D2 can be appropriately adjusted.

In the embodiment described above, the example in which the present stroke adjustment method is applied to the electromagnetic fuel injection valve 1 that electromagnetically drives the valve member 30 has been described. However, the stroke adjustment method can also be applied to a fuel injection valve that drives the valve member 30 by a piezoelectric effect or a magnetostrictive phenomenon.

The present invention is not limited to the above embodiments, but various modifications may be contained. The above-described embodiments have been described in detail for clear understating of the present invention, and are not necessarily limited to those having all the described configurations. Some of the configurations of a certain embodiment may be replaced with the configurations of the other embodiments, and the configurations of the other embodiments may be added to the configurations of a certain embodiment. In addition, some of the configurations of each embodiment may be omitted, replaced with other configurations, and added to other configurations.

For example, in the above-described embodiment, the example of the configuration in which the first end surface 42*a* of the movable core 42 and the end surface 41*b* of the fixed core 41 come into contact with each other has been described. However, it is also possible to provide a protrusion on at least one of the first end surface 42*a* of the movable core 42 and the end surface 41*b* of the fixed core 41 such that the protrusion of one member and the end surface of the other member or the protrusions of both members abut on each other. In this case, the above-described gap G1 is a gap between both abutting portions of the fixed core 41 and the movable core 42.

In the above-described embodiment, the example of the configuration in which the recess 423 is formed in the movable core 42 has been described. However, the recess 423 may not be formed in the movable core 42. In this case, the first end surface 42*a* of the movable core 42 is engaged with the engagement surface 33*a* of the flange portion 33 of the valve member 30, and serves as a contact portion that abuts on the tip portion 52*a* on the opening side of the peripheral wall portion 52 of the gap forming member 50. Even in this case, the same effects as those of the above-described embodiment can be obtained.

REFERENCE SIGNS LIST

1 fuel injection valve
21*b* valve seat
30 valve member

31 valve rod portion
32 valve body
33 flange portion (engagement portion)
33*a* engagement surface (engagement portion, first side portion)
33*b* contact surface (reference position, second side portion)
34 protrusion
33*b* contact surface (reference position)
41 fixed core
42 movable core (movable element)
423*a* bottom surface (engagement portion)
50 gap forming member
50*a* internal space
51*a* bottom surface (first portion)
52*a* opening side end portion (second portion)
54 inclination regulating portion
100 first jig
101 insertion hole
102 contact surface
103 first pressing surface
110 second jig
111 fitting hole
113 second pressing surface
G2 gap
Hs height dimension of internal space
Hc height dimension of flange portion
S1 step

The invention claimed is:

1. A prestroke adjustment method for adjusting a prestroke amount of a fuel injection valve that includes:

a valve member having a valve body at a tip portion, the valve body being capable of seating on and separating from a valve seat;

a movable element relatively displaceable in a valve opening/closing direction with respect to the valve member and engageable with the valve member; and a gap forming member configured to be relatively displaceable in the valve opening/closing direction with respect to the valve member and the movable element, the gap forming member forming a gap defining a prestroke between the valve member and an engagement portion of the movable element by a second portion abutting on the movable element while a first portion is positioned at a reference position of the valve member, wherein the gap forming member has an adjustment margin before adjustment of the prestroke amount, a load in a direction from the first portion toward the reference position of the valve member is applied to the gap forming member while being assembled to the valve member, the gap forming member is plastically deformed to reduce a relative length between the first portion and the second portion to set the prestroke amount to a target value, the load is applied to the gap forming member by sandwiching the gap forming member assembled to the valve member between a first jig and a second jig, the first jig has a contact surface on which an engagement portion of the valve member abuts and a first pressing surface on which the second portion of the gap forming member abuts, the contact surface forms a step having a height corresponding to the target value of the prestroke amount with respect to the first pressing surface, and plastic deformation of the gap forming member is performed until the first portion of the gap forming member abuts on the reference position of the valve member while the engagement portion of the valve member abuts on the contact surface of the first jig and while the second portion of the gap forming member abuts on the first pressing surface of the first jig.

2. The prestroke adjustment method according to claim 1, wherein the valve member includes a valve rod portion in which the valve body is provided at one end portion and extends in a valve opening/closing direction, and a flange portion provided at other end portion of the valve rod portion and protruding outward in a radial direction from the valve rod portion, in the flange portion, a first side portion facing the valve body side constitutes an engagement portion with respect to the movable element, and a second side portion facing a side opposite to the valve element side constitutes the reference position, the gap forming member is a bottomed cylindrical body having an internal space capable of accommodating the flange portion and opening toward the movable element, a height dimension from a bottom surface to an opening end of the internal space of the gap forming member is set to be larger than a height dimension from the first side portion to the second side portion of the flange portion, the bottom surface of the gap forming member constitutes the first portion, and an opening side end portion constitutes the second portion, and plastic deformation of the gap forming member is performed until the bottom surface of the gap forming member comes into contact with the second side portion of the flange portion while the gap forming member and the valve member are arranged such that a dimensional difference between the opening side end portion of the gap forming member and the first side portion of the flange portion of the valve member becomes the target value of the prestroke amount.

3. The prestroke adjustment method according to claim 2, wherein the load is applied to the gap forming member by sandwiching the gap forming member assembled to the valve member between a first jig and a second jig, the first jig has a contact surface on which the first side portion of the flange portion abuts and a first pressing surface on which the opening side end portion of the gap forming member abuts, the contact surface forms a step having a height corresponding to a target value of the prestroke amount with respect to the first pressing surface, and plastic deformation of the gap forming member is performed until the bottom surface of the gap forming member abuts on the second side portion of the flange portion while the first side portion of the flange portion of the valve member abuts on the contact surface of the first jig and while the opening side end portion of the gap forming member abuts on the first pressing surface of the first jig.

4. The prestroke adjustment method according to claim 3, wherein the first jig has a first insertion hole through which the valve body and the valve rod portion of the valve member can be inserted, the contact surface of the first jig is formed at an opening edge of the first insertion hole, and when the load is applied to the gap forming member, the valve member is configured such that the flange portion is in contact with the contact surface of the first jig while the valve body and the valve rod portion are inserted into the first insertion hole of the first jig.

5. The prestroke adjustment method according to claim 4, wherein the valve member has a protrusion extending from the flange portion to a side opposite to the valve rod portion, the gap forming member includes a cylindrical inclination regulating portion slidable on the protrusion of the valve member, the second jig has a fitting hole into which the inclination regulating portion can be fitted, and has a second pressing surface in contact with a bottom of the gap forming member on an outer peripheral side of the fitting hole, and the load is applied to the gap forming member by bringing the second pressing surface of the second jig into contact with the bottom of the gap forming member while the fitting hole of the second jig is fitted to the inclination regulating portion of the gap forming member.

* * * * *